United States Patent [19]

Gilbert et al.

[11] 3,981,056
[45] Sept. 21, 1976

[54] DRIVE MECHANISMS FOR LATHE SPINDLES

[75] Inventors: Harold James Gilbert; Edmund Alexander McConnell, both of Coventry, England

[73] Assignee: Wickman Machine Tool Sales Limited, Coventry, England

[22] Filed: June 27, 1974

[21] Appl. No.: 483,778

[30] Foreign Application Priority Data
June 27, 1973 United Kingdom............ 30663/73

[52] U.S. Cl................................. 29/38 B; 318/9
[51] Int. Cl.².................................. B23B 9/10
[58] Field of Search............. 29/38 A, 38 B, 37, 39, 29/40; 408/35; 318/9, 15, 696

[56] References Cited
UNITED STATES PATENTS

| | | |
|---|---|---|
| 2,876,527 | 3/1959 | Matlachowsky.................. 29/38 B |
| 3,296,896 | 10/1967 | Uhtenwoldt........................ 408/35 |
| 3,762,035 | 10/1973 | Ledergerber et al............. 29/38 B |
| 3,831,487 | 8/1974 | Villano............................. 90/13 C |

*Primary Examiner*—Gil Weidenfeld
*Attorney, Agent, or Firm*—Holman & Stern

[57] ABSTRACT

A drive mechanism for producing angular movement of at least one work spindle of a multi or single spindle lathe comprising an electrical stepping motor arranged to drive the spindle through gearing and a one way clutch, to allow the spindle to be angularly orientated for carrying out cross drilling or other operations on workpieces held in the work sindle.

1 Claim, 2 Drawing Figures

DRIVE MECHANISMS FOR LATHE SPINDLES

FIELD OF THE INVENTION

This invention relates to drive mechanisms for work spindles on multi-spindle lathes, whereby one or more of the spindles can be moved angularly about the spindle axis to predetermined positions.

BACKGROUND OF THE INVENTION

Such an apparatus is used to position a work spindle in predetermined angular relationship to a tool in order that a machining operation may be carried out on a workpiece carried by the spindle. For example it may be required to carry out a drilling operation on a workpiece, in a direction which is transverse with respect to the axis of the work spindle. For this purpose, it is necessary to ensure that the work spindle will not rotate from the required position about the spindle axis and also that it is correctly aligned with respect to the tool so as to produce the desired position of the hole to be drilled. Angular orientation of the work spindle may also be required for automatic loading of shaped workpieces.

This angular movement has, in the past, been achieved in one example by the use of a cam whereby the work spindle can be rotated, the cam having a recess, corresponding with the predetermined position, in which a cam follower will locate. This arrangement tends to be somewhat inflexible as well as having other disadvantages.

SUMMARY OF THE INVENTION

It is the object of this invention to provide a drive mechanism for producing angular movement of a work spindle on a lathe in a convenient and efficient form.

According to the present invention a drive mechanism for producing angular movement of a work spindle on a multispindle lathe comprises an electrical stepping motor connected to the spindle through disconnectible drive means, the spindle also having an associated brake.

DESCRIPTION OF THE DRAWINGS

The invention will now be described by way of example with reference to the accompanying drawings in which.

DESCRIPTION OF PREFERRED EMBODIMENTS

Figure 1:
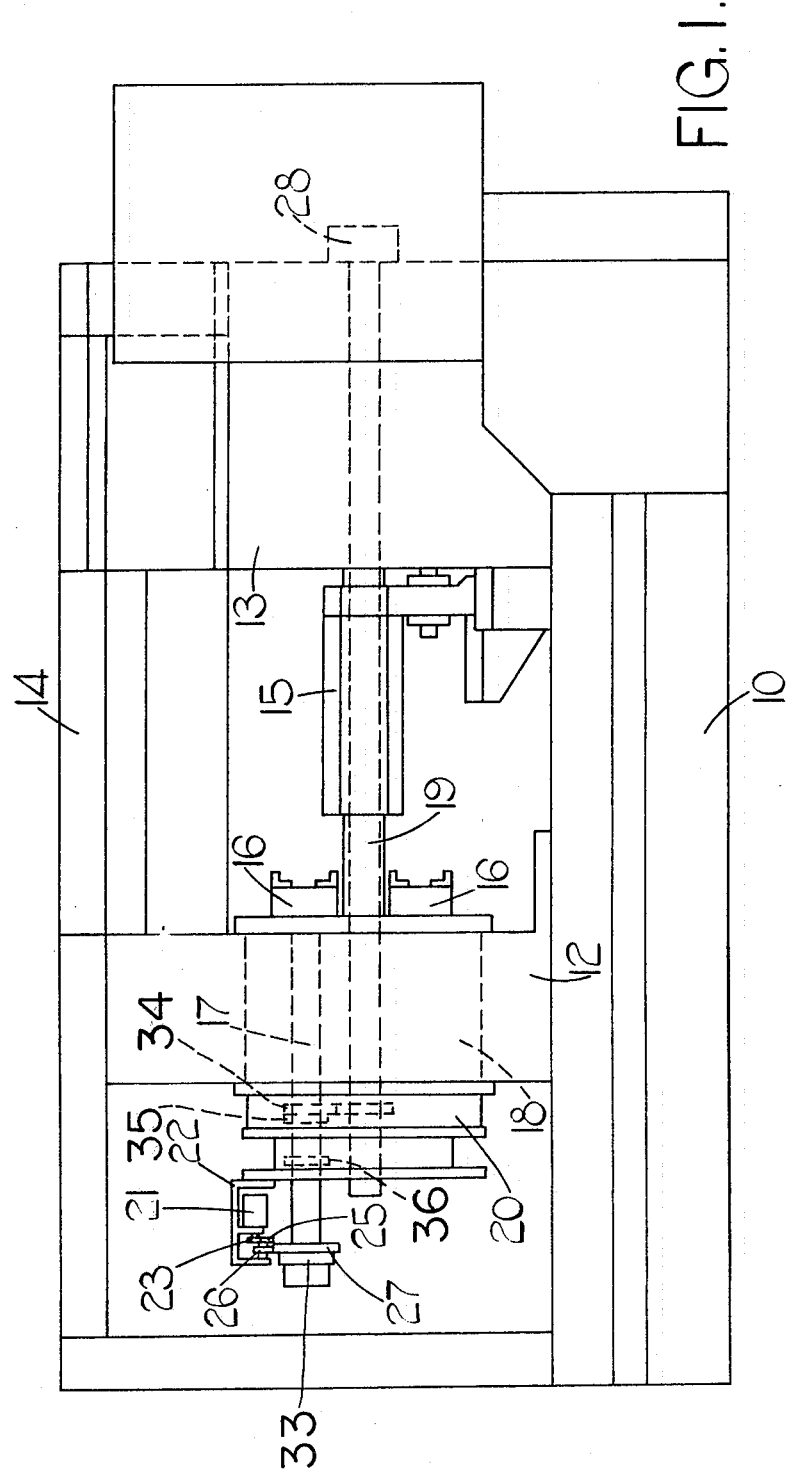
FIG. 1 is a diagrammatic side elevation view of a multi-spindle lathe incorporating the present invention.
Figure 2:
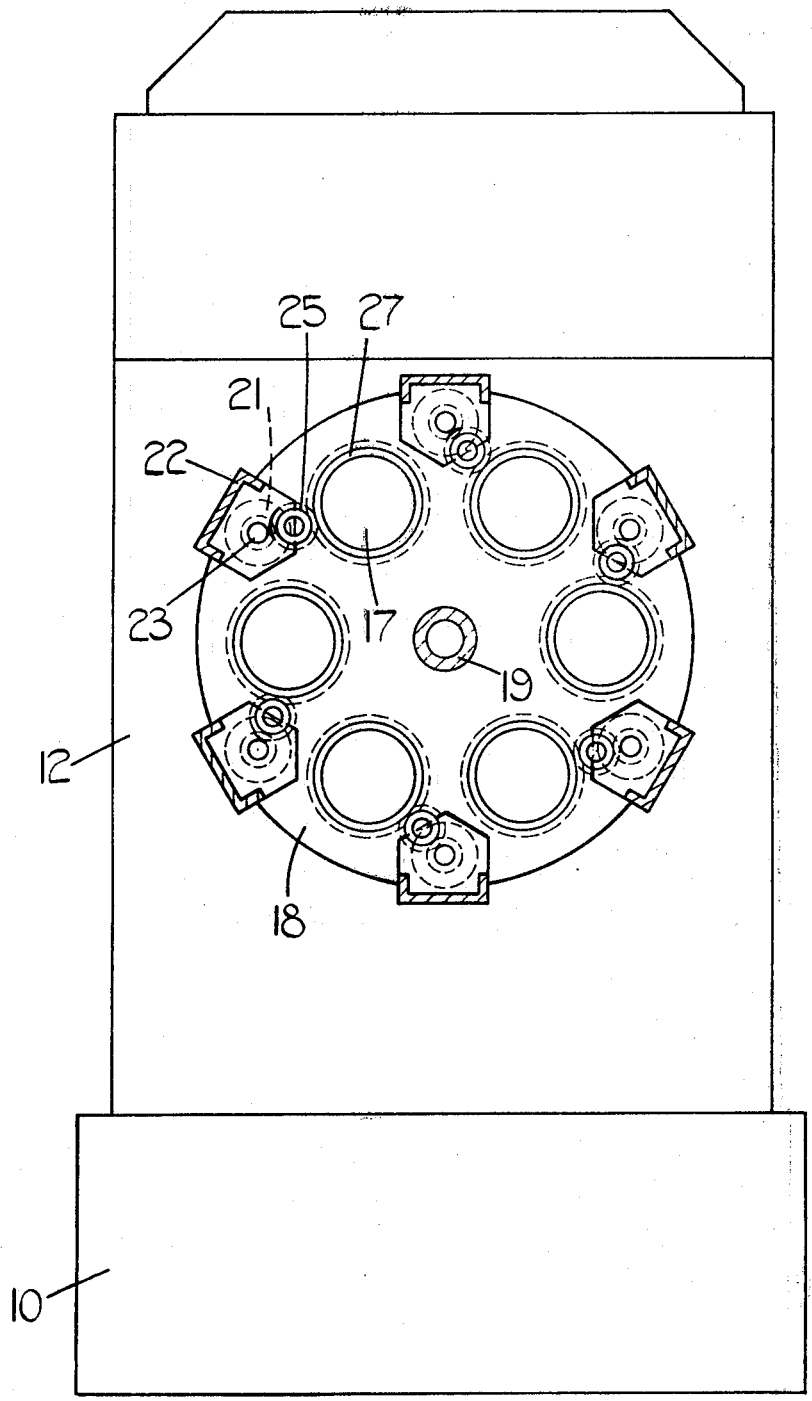
FIG. 2 is a diagrammatic cross-sectional view thereof.

The lathe illustrated in FIGS. 1 and 2 comprises a base 10 on which is mounted a drum housing 12 and a drive housing 13 connected by a bridge 14. In the center of the machine, between the housings 12 and 13, there is a space occupied by a longitudinally slidable tool block 15 and other transversely movable tool slides (not illustrated) which are arranged to carry tools for operation upon workpieces.

The workpieces, which are not illustrated, are held in respective chucks 16, mounted on respective hollow work spindles 17, rotatably mounted in a drum 18 which is itself rotatably mounted in the drum housing 12 for indexing between successive angular positions. In this example there are six work spindles.

A drive shaft 19 passes through the center of the drum 18 and extends into the drive housing 13 where it is connected to a drive mechanism which is not illustrated. The drive shaft 19 also extends through the tool block 15, and provides the drive to each spindle 17 during normal operation.

Secured to the drum 18, at its end remote from the chucks 16, is a drum extension 20, to which are attached six mechanisms for the work spindles 17 respectively. Each such drive mechanism, only one of which is shown in FIG. 1, comprises an electrical stepping motor 21, mounted in a bracket 22 secured to the drum extension 20. The spindle of the stepping motor 21 carries a gear 23 meshing with another gear 25 on a spindle mounted in the bracket 22, on which is also provided a gear 26. The gear 26 in turn meshes with a gear ring 27 on the associated work spindle 17. The gear train 23, 25, 26 and 27 incorporates a one way clutch mechanism 33 allowing the spindle 17 to be rotated by the electrical stepping motor 21 in one direction only.

Each of the work spindles 17 are normally driven by a main gear 34 or other drive mechanisms through clutch and brake mechanisms 35, 36 which may be electrically operated. The arrangement is such that when driven by such main drive mechanisms, the spindles 17 rotate in a direction to allow the one-way clutch 33 of the stepping motor gear train to operate so that the electrical stepping motor is not correspondingly rotated. The clutch, brake and drive mechanisms illustrated diagrammatically in FIG. 1 are omitted from FIG. 2 for the sake of clarity.

However, if it is desired to move a work spindle to a predetermined angular position with respect to its rotational axis, such spindle is first stopped by means of its associated brake 36. The main drive is effectively uncoupled from the work spindle by the clutch 35 and the brake 36 is then released. The electrical stepping motor 21 is actuated by a suitable electrical control unit to move the spindle angularly to a datum position and subsequently to the required predetermined position. When such position has been reached, the brake is re-applied to lock the spindle so that an operation, such as cross drilling, can be carried out on a workpiece carried in the chuck 16 of that spindle.

Provision for adjustment of the pre-set position, to which the electrical stepping motor will move the spindle, is provided. The adjustment means may include an electrical switch arranged at a datum position. After the spindle has been brought to rest in any angular position, the stepping motor will rotate the spindle until the datum position is reached. It then continues to rotate the spindle for a predetermined number of steps to the required position. A high degree of accuracy can be achieved in positioning the spindle angularly about its rotational axis.

The electrical supply for the stepping motors 21 is provided through the shaft 19 which is made hollow for this purpose. Within the drive housing 13, this shaft 19 carries a slip ring assembly indicated generally at 28 whereby the electrical connections are made between rotating and stationary parts of the lathe.

We claim:

1. In a multi-spindle lathe a drive mechanism including means for producing angular movement of a work spindle of the multi-spindle lathe comprising an electrical stepping motor connected to the spindle, disconnectible drive means optionally connecting the stepping motor with the spindle, and a brake for said spindle, the improvement in which a plurality of stepping motors are mounted on a drum, means for indexing said drum, said drum having a plurality of work spindles rotatably mounted in the drum, the respective stepping motors being drivingly engagable through said disconnectable drive means with the respective spindles.

* * * * *